US009559816B2

(12) United States Patent
Axmon et al.

(10) Patent No.: US 9,559,816 B2
(45) Date of Patent: Jan. 31, 2017

(54) TECHNIQUE FOR SELECTING RADIO RESOURCES

(71) Applicant: Telefonaktiebolaget L M Ericsson (publ), Stockholm (SE)

(72) Inventors: Joakim Axmon, Kävlinge (SE); Patrik Gustavsson, Lund (SE); Dandan Hao, Beijing (CN); Michael Herrmann, Nuremberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/443,685

(22) PCT Filed: Apr. 20, 2015

(86) PCT No.: PCT/EP2015/058500
§ 371 (c)(1),
(2) Date: May 19, 2015

(87) PCT Pub. No.: WO2015/176892
PCT Pub. Date: Nov. 26, 2015

(65) Prior Publication Data
US 2016/0226634 A1 Aug. 4, 2016

(30) Foreign Application Priority Data
May 19, 2014 (WO) .............. PCT/CN2014/077795

(51) Int. Cl.
*H04L 5/00* (2006.01)
*H04W 56/00* (2009.01)
(Continued)

(52) U.S. Cl.
CPC ............. *H04L 5/001* (2013.01); *H04L 5/0035* (2013.01); *H04L 5/0044* (2013.01);
(Continued)

(58) Field of Classification Search
CPC ...... H04L 5/001; H04L 5/0035; H04L 5/0044; H04L 5/0053; H04L 47/27; H04W 24/02; H04W 72/085
See application file for complete search history.

(56) References Cited

U.S. PATENT DOCUMENTS

2011/0211571 A1* 9/2011 Ryu ...................... H04J 3/0682
370/350
2011/0249641 A1 10/2011 Kwon et al.
(Continued)

FOREIGN PATENT DOCUMENTS

| EP | 2557867 A1 | 2/2013 |
|---|---|---|
| WO | 2012119626 A1 | 9/2012 |
| WO | 2012154112 A1 | 11/2012 |

OTHER PUBLICATIONS

3GPP, "Discussion on the Maximum Received Timing Difference for Dual Connectivity", 3GPP TSG-RAN WG4 #70-BIS R4-141623, Mar. 31-Apr. 4, 2014, pp. 1-3.
(Continued)

*Primary Examiner* — Magdi Elhag
(74) *Attorney, Agent, or Firm* — Murphy, Bilak & Homiller, PLLC

(57) ABSTRACT

A technique for selecting a set of radio resources of a cellular telecommunications network for radio resource aggregation in a communication between the telecommunications network and a User Equipment (UE) is provided. As to a method aspect of the technique, a time offset relative to a primary radio resource for each of at least two secondary radio resources is monitored. The primary radio resource and the at least two secondary radio resources are provided by the telecommunications network for radio resource aggregation. Out of the at least two secondary radio resources, a set of radio resources is selected so that the time offsets monitored for the selected secondary radio resources (Continued)

200

Monitor a time offset relative to a primary radio resource for each of at least two secondary radio resources, the primary radio resource and the at least two secondary radio resources being provided by a telecommunications network for radio resource aggregation — 202

If a spread of the monitored time offsets exceeds a threshold, select out of the at least two secondary radio resources a set of radio resources so that the time offsets monitored for the selected secondary radio resources fall within a time window having a width equal to or less than the threshold — 204 fall within a time window having a width equal to or less than the threshold, if a spread of the monitored time offsets exceeds a threshold.

34 Claims, 5 Drawing Sheets

(51) Int. Cl.
*H04L 12/807* (2013.01)
*H04W 24/02* (2009.01)
*H04W 72/08* (2009.01)

(52) U.S. Cl.
CPC .......... *H04L 5/0053* (2013.01); *H04L 5/0078* (2013.01); *H04L 47/27* (2013.01); *H04W 24/02* (2013.01); *H04W 56/003* (2013.01); *H04W 56/0055* (2013.01); *H04W 72/085* (2013.01)

(56) References Cited

U.S. PATENT DOCUMENTS

| | | | |
|---|---|---|---|
| 2012/0099577 | A1 | 4/2012 | Baldemair et al. |
| 2013/0064219 | A1* | 3/2013 | Siomina ............... G01S 5/0236 370/331 |
| 2013/0102322 | A1* | 4/2013 | Nakamori ............... H04L 5/001 455/455 |
| 2013/0250925 | A1 | 9/2013 | Löhr et al. |
| 2013/0272233 | A1* | 10/2013 | Dinan ............... H04W 72/0406 370/329 |
| 2013/0294369 | A1* | 11/2013 | Dinan ..................... H04L 5/001 370/329 |
| 2014/0029586 | A1 | 1/2014 | Loehr et al. |
| 2014/0092844 | A1 | 4/2014 | Xiao et al. |
| 2015/0031377 | A1* | 1/2015 | Charbit ................. H04W 48/08 455/450 |
| 2015/0045061 | A1* | 2/2015 | Da ........................ H04W 4/023 455/456.2 |
| 2015/0131569 | A1* | 5/2015 | Rosa ................... H04W 72/042 370/329 |
| 2015/0230112 | A1 | 8/2015 | Siomina et al. |
| 2015/0304875 | A1* | 10/2015 | Axmon ................. H04W 24/10 370/328 |
| 2016/0234706 | A1* | 8/2016 | Liu ........................... H04L 5/00 |

OTHER PUBLICATIONS

3GPP, "Handling of Activation/Deactivation in Dual Connectivity", 3GPP TSG-RAN WG2 #84 Tdoc R2-133992, Nov. 11-15, 2013, pp. 1-2.
3GPP, "LS on SFN Handling in the Dual Connectivity", 3GPP TSG-RAN WG2 Meeting 85bis R2-141849, Mar. 31-Apr. 4, 2014, pp. 1-2.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0, Mar. 2013, 1-209.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.9.0, Mar. 2014, 1-210.
3GPP, "3rd Generation Partnership Project; Technical Specification Group Radio Access Network; Evolved Universal Terrestrial Radio Access (E-UTRA); Base Station (BS) radio transmission and reception (Release 10)", 3GPP TS 36.104 V10.11.0, Jul. 2013, 1-115.
3GPP, "3rd Generation Partnership Project; Technical Specification Group Radio Access Network; Evolved Universal Terrestrial Radio Access (E-UTRA); Base Station (BS) radio transmission and receptor (Release 11)", 3GPP TS 36.104 V11.4.0, Mar. 2013, 1-134.
3GPP, "3rd Generation Partnership Project; Technical Specification Group Radio Access Network; Evolved Universal Terrestrial Radio Access (E-UTRA); Base Station (BS) radio transmission and reception (Release 11)", 3GPP TS 36.104 V11.6.0, Sep. 2013, 1-137.
3GPP, "3rd Generation Partnership Project; Technical Specification Group Radio Access Network; Evolved Universal Terrestrial Radio Access (E-UTRA); Carrier Aggregation; Base Station (BS) radio transmission and reception (Release 10)", 3GPP TR 36.808 V10.1.0, Jul. 2013, 1-31.
3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.5.0, Dec. 2013, 1-120.
3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.1.0, Mar. 2014, 1-186.
3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.7.0, Mar. 2014, 1-350.
3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-356.
3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.3.0, Mar. 2014, 1-820.
3GPP, "3rd Generation Partnership Project; Technical Specification Group Radio Access Network; Study on Small Cell enhancements for E-UTRA and E-UTRAN; Higher layer aspects (Release 12)", 3GPP TR 36.842 V12.0.0, Dec. 2013, 1-71.
Unknown, Author, "LS on maxumum relative propagation delay difference among the component carriers in intra-band non-contiguous CA", TSG-RAN Working Group 4 (Radio) meeting #70bis, R4-142358, San Jose del Cabo, Mexico, Mar. 31-Apr. 4, 2014, 1-3.
Ericsson, "Phase II ca: RSTD measurement reporting in carrier aggregation, Scenario #3 FDD", 3GPP TSG RAN WG4 Meeting #62, R4-120665, Ericsson, ST-Ericsson, Dresden, Germany, Feb. 6-10, 2012, 1-6.

\* cited by examiner

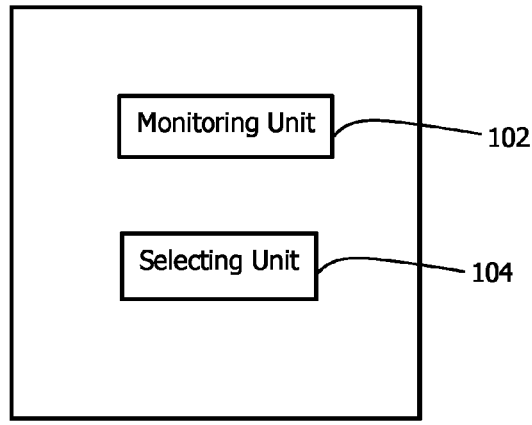

| Monitor a time offset relative to a primary radio resource for each of at least two secondary radio resources, the primary radio resource and the at least two secondary radio resources being provided by a telecommunications network for radio resource aggregation | 202 |

↓

| If a spread of the monitored time offsets exceeds a threshold, select out of the at least two secondary radio resources a set of radio resources so that the time offsets monitored for the selected secondary radio resources fall within a time window having a width equal to or less than the threshold | 204 |

TECHNIQUE FOR SELECTING RADIO RESOURCES

TECHNICAL FIELD

The present disclosure generally relates to a technique for selecting radio resources of a cellular telecommunications network. More specifically, and without limitation, a method and a device for selecting radio resources to be aggregated are provided.

BACKGROUND

Carrier aggregation (CA), including intra-node and inter-node Carrier Aggregation, was introduced in Release 10 of the Evolved Universal Terrestrial Radio Access Network (E-UTRAN) standard as a means for qualifying E-UTRAN to meet the requirements for 4G (1000 Mbit/s) as well as for allowing operators with small (less than 20 MHz) scattered spectrum allocations to provide a good user experience by aggregating the scattered allocations into, e.g., bandwidths of 10 MHz, 20 MHz or more.

The user equipment (UE) is connected to a serving cell termed Primary Cell (PCell) on what is referred to as the Primary Component Carrier (PCC). Mobility is catered for on this carrier. In case the UE is using services that require high throughput, the network may activate one or more additional serving cells, each termed Secondary Cell (SCell), on what is referred to as Secondary Component Carrier(s) (SCC(s)). The activation may happen before or after the SCell has been detected by the UE.

Two types of aggregation scenarios are considered for Release 10 (e.g., according to documents 3GPP TS 36.104 V10.11.0 and 3GPP TR 36.808 V10.1.0): (i) intra-band contiguous aggregation, and (ii) inter-band aggregation. In Release 11 (e.g., according to document 3GPP TS 36.104 V11.6.0, Sect. 6.5.3.1 and Table 5.5-4), one more is considered: (iii) intra-band non-contiguous aggregation.

For intra-band contiguous carrier aggregation, the PCell and one or more SCells are contiguous in frequency. It is required from the standard that for contiguous intra-band aggregation, the time difference between PCell and SCell is allowed to be at most ±130 ns (3GPP TS 36.104, V11.4.0, sub-clause 6.5.3). It is further assumed in the standard that for this particular scenario, one can use a single Fast Fourier Transform (FFT) operation or block to demodulate the signal from both PCell and SCell simultaneously. Thus, in practice, it is required that the PCell and SCell are collocated, i.e., transmitted from the same site, since otherwise propagation delay would make it impossible to use a single FFT.

For intra-band non-contiguous aggregation the timing difference is allowed to be at most ±260 ns, but no assumption is made on that the cells are co-located or that a single FFT can be used.

For inter-band carrier aggregation the timing difference between the PCell and SCell is allowed to be at most ±260 ns. However, for this scenario it is further assumed that the cells may be non-collocated and that the UE will have to cope with a propagation delay difference between PCell and SCell of up to ±30 µs, resulting in a maximum delay spread of ±30.26 µs (3GPP TS 36.300, V11.5.0, Annex J).

Existing techniques for aggregating radio resources are not suitable for the increasing complexity of cellular networks, e.g., heterogeneous networks including cells operated at largely different power levels, such as macro-cells and pico-cells. With inter-node radio resource aggregation, new deployment scenarios are encountered. Not all timings for cells under which the UE has coverage simultaneously are such that they fall within the time difference that the UE can handle, e.g. ±30.26 µs. Hence, some cells will not be suitable to use for aggregation, but the UE has no means for indicating which cells can be used to the network.

Later network deployments (3GPP TS Rel. 12 and onwards, including 5G) will be even more complex, and it will be virtually impossible to predict and configure the coverage a UE is provided at any given location, or the timing difference the UE observes among all cells within the coverage the UE is currently located. To assess such information, extensive drive tests would be needed every time a new cell or frequency layer is added in the area.

SUMMARY

Accordingly, there is a need for a technique that flexibly selects radio resources for aggregation. Alternatively or in addition, there is a need for a technique that selects radio resources for aggregation more efficiently.

According to one aspect, a method of selecting a set of radio resources of a cellular telecommunications network for radio resource aggregation in a communication between the telecommunications network and a User Equipment (UE) is provided. The method comprises the step of monitoring a time offset relative to a primary radio resource for each of at least two secondary radio resources, the primary radio resource and the at least two secondary radio resources being provided by the telecommunications network for radio resource aggregation; and the step of selecting out of the at least two secondary radio resources a set of radio resources so that the time offsets monitored for the selected secondary radio resources fall within a time window having a width equal to or less than the threshold, if a spread of the monitored time offsets exceeds a threshold.

The method may, at least in part, be performed by the UE.

The primary radio resource may relate to a cell of the telecommunications network currently serving the UE, e.g., in a Radio Resource Control (RRC) connected mode of the UE in relation to the telecommunications network. The primary radio resource may relate to a primary cell (PCell). Some or each of the secondary radio resource may relate to a cell (which is also referred to a secondary cell or SCell) of the telecommunications network other than the PCell.

The set (e.g., the set of radio resources for radio resource aggregation) may include the primary radio resource. The primary radio resource may always be (implicitly or expressly) included in the set. The time window may include a reference time (e.g., zero or an origin of the time axis) of the primary radio resource.

The selection step may include the substep of shifting the time window relative to the primary radio resource. The selection step may further include the substep of selecting some or all of the secondary radio resources the time offsets of which fall within the shifted time window.

The time window may be shifted so as to maximize or optimize a number of selected secondary radio resources. Alternatively or in combination, the time window may be shifted so as to maximize or optimize a bandwidth of the selected secondary radio resources.

The selection may be based on signal measurements. The signal measurements may be performed by the UE for some or each of the at least two secondary radio resources. The signal measurements of those secondary radio resources that are selected may fulfill a predetermined criterion.

The signal measurements may be repeatedly performed for some or each of the at least two secondary radio resources. The selection may depend on a trend of the repeated signal measurements.

The selection step may include the substep of assigning priorities to some or each of the at least two secondary radio resources. The selection may be based on the assigned priorities. E.g., the assigned priorities may give preference to previously selected secondary radio resources. Alternatively or in combination, the assigned priorities may give preference to secondary radio resources currently used for the communication between the telecommunications network and the UE. Alternatively or in combination, a radius of coverage of the secondary radio resource may contribute to the priority assigned to the secondary radio resource.

The selection may be restricted to those secondary radio resources, the time offset of which does not exceed the threshold.

The method may further comprise the step of receiving a message from the telecommunications network. The message may configure the UE to monitor the at least two secondary radio resources for radio aggregation. The message may be indicative of at least some of the at least two secondary radio resources.

The method may further comprise the step of reporting the set of radio resources for radio resource aggregation to the telecommunications network. The set may be reported (e.g., by a report) to the telecommunications network. The set may be reported, if (e.g., only if) the spread of the monitored time offsets exceeds the threshold.

The report may further include results of the signal measurements for some or each of the selected secondary radio resources.

The steps of monitoring and/or selecting may be repeated, e.g. as part of an iteration. Time offsets may be monitored also for secondary radio resources not previously selected. The UE may report in response to one or more time offsets monitored for the secondary radio resources entering the time window.

The set (e.g., the set of radio resources for radio resource aggregation) may be reported by indicating to the telecommunications network those one or more secondary radio resources provided by the telecommunications network and not included in the set. Alternatively or in addition, the report may indicate only changes to the set.

The secondary radio resources may include one or more Secondary Cells (SCells), one or more Secondary Component Carriers (SCCs) and/or one or more neighboring cells relative to a cell serving the UE.

The aggregation may include a Carrier Aggregation (CA) and/or the radio resources in the set may include Component Carriers (CCs) for the CA.

The aggregation may include an intra-frequency aggregation and/or the radio resources in the set may include different spatial streams for the intra-frequency aggregation.

At least some of the radio resources may relate to non-collocated cells of the telecommunications network and/or different nodes of the telecommunications network.

The aggregation may include a Coordinated Multi-Point, CoMP, operation.

Also provided is a computer program product comprising program code portions for performing the methods or method aspects disclosed herein when the computer program product is executed by a computing device. The computer program product may be stored on a computer-readable recording medium, such as an optical memory or semiconductor memory. The computer program product may also be provided for download via a data network, e.g., the telecommunications network or the Internet.

As to a hardware aspect, a device for selecting a set of radio resources of a cellular telecommunications network for radio resource aggregation in a communication between the telecommunications network and a User Equipment (UE) is provided. The device comprises a monitoring unit adapted to monitor a time offset relative to a primary radio resource for each of at least two secondary radio resources, the primary radio resource and the at least two secondary radio resources being provided by the telecommunications network for radio resource aggregation; and a selecting unit adapted to select out of the at least two secondary radio resources a set of radio resources so that the time offsets monitored for the selected secondary radio resources fall within a time window having a width equal to or less than the threshold, if a spread of the monitored time offsets exceeds a threshold.

The device may be implemented in the UE.

The UE may detect that one or more activated SCells are getting out-of-range (e.g., as defined by the time window). The may remove any such cells from the aggregation set. The may continue monitoring the one or more cells for inclusion to the aggregation set once getting in range again.

In case the time difference between the earliest arriving and latest arriving cell (with respect to radio frame) in the aggregation set depends on two SCells, the UE may evaluate which one of the two SCells would be most beneficial to be kept when the time difference between them exceeds then supported range (e.g., the threshold). An exemplary minimum requirement to be supported is the threshold of 30.26 μs (for the time difference according to 3GPP TS 36.300, V11.9.0, Appendix 3.1).

Means for the selection (e.g., when deciding which SCell to drop) may include, without being limited thereto, one or more of: monitoring downlink Block Error Rate (BLER); monitoring achieved throughput; monitoring Channel State Information (CSI) (e.g. including a Channel Quality Indicator, CQI, and/or a Rank Indicator, RI); monitoring signal to interference ratios (SINR) or Reference Signal Received Quality (RSRQ); monitoring signal strength (e.g. Reference Signal Received Power, RSRP); monitoring cell timing; monitoring trends (e.g., rising, stable, and/or falling) of any or all of the above metrics; monitoring services provided on SCells, e.g. Multimedia Broadcast Multicast Service (MBMS); deciding based on characteristics of cells on that carrier (e.g., prioritizing SCells with large cell radius when the UE is mobile); deciding based on maximum theoretical throughput in cell (cell bandwidth, number of transmit (Tx) ports in use, Time-Division Duplex, TDD, uplink/downlink configuration, MBSFN); deciding based on whether the SCell has an associated UL, and in case of two such SCells, taking Timing Advance (TA) into account; and deciding based on whether the SCell is used to allocate resources also on another carrier (cross carrier scheduling).

Moreover, the selection may include an evaluation of an activated SCell for inclusion in the aggregation set at the expense of another SCell. E.g., when inclusion of the SCell would lead to that one has to replace another SCell in order to maintain a maximum time difference (e.g., the threshold) between the earliest and the latest arriving cells that is within the range the UE can handle (e.g. 30.26 μs).

The radio resources may relate to signal reception at the UE (e.g., for downlink radio communication) and/or signal transmission from the UE (e.g., for uplink radio communication). The radio resources may include different signal sources. The radio resources may be distinguished by frequency, space, cell identity, cell-specific reference signals (CRSs) or a combination thereof.

The technique may be implemented solely for selecting a set of radio resources (for the later aggregation) at the network based on UE reporting. Optionally, a step of configuring the aggregation may be performed, e.g., by the telecommunications network based on the report.

The telecommunications network node may take UE capabilities into account for configuring radio resource aggregation based on the report. Some implementations of the technique may avoid configuring a UE not capable of inter-site and/or inter-node radio resource aggregation with a SCell neighbor cell list.

The UE may report capability to the telecommunications network, e.g., its capability regarding how much time difference the UE can handle in radio resource aggregation, e.g., between the earliest and the latest arriving cells (with respect to frame timing). The LTE standard specifies as minimum requirement that the UE shall be able to handle a delay spread of ±30.26 μs (3GPP TS 36.300, V11.5.0, Annex J) for both inter-band and intra-band carrier aggregation (3GPP Tdoc R4-142358). The UE may be capable of handling longer time windows. The reported capability may be used by the telecommunications network (e.g., a node thereof) when deciding which time-difference threshold to configure and/or which potential SCell or SCells to include in the neighbor cell list sent to the UE.

The device may further comprise any feature disclosed in the context of the method aspect.

BRIEF DESCRIPTION OF THE DRAWINGS

The technique is described in more detail with reference to exemplary embodiments illustrated in the drawings, wherein FIG. 1 schematically illustrates a device for selecting a set of radio resources;

FIG. 2 shows a flowchart for method of selecting a set of radio resources;

DETAILED DESCRIPTION

Figure 3:
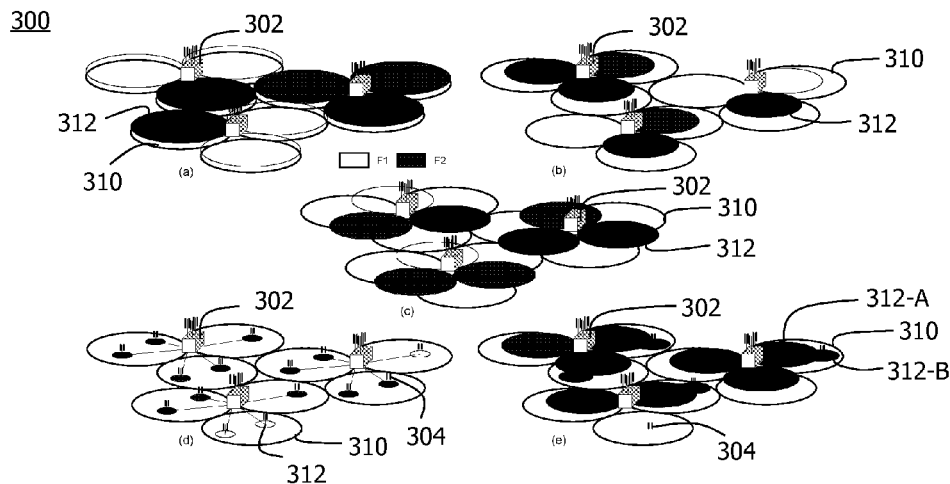
FIG. 3 schematically illustrates a setup for radio resource aggregation in a cellular telecommunications network.

In the following description of exemplary embodiments, for purposes of explanation and not limitation, specific details are set forth in order to provide a thorough understanding of the present disclosure. It will be apparent to one skilled in the art that the present disclosure may be practiced in other embodiments that depart from these specific details. While embodiments are described in the context of Long Term Evolution (LTE), the technique can be implemented also in the context of any other cellular data network.

Still further, those skilled in the art will appreciate that the services, functions and steps explained herein may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described with reference to methods and devices, the present disclosure may also be embodied in a computer program product as well as in a system comprising a computer processor and a memory coupled to the processor, wherein the memory is encoded with one or more programs that may perform the services, functions and steps disclosed herein.

Below definitions may be applied to any aspect and any embodiment described herein.

In some embodiments the non-limiting term "user equipment" or "UE" is used. The term UE, as used herein, can be any type of wireless device capable of communicating with network node or another UE over radio signals. The UE may also be radio communication device, target device, device to device (D2D) UE, machine type UE or UE capable of machine to machine communication (M2M), a sensor equipped with UE, PAD, Tablet, mobile terminals, smart phone, laptop embedded equipped (LEE), laptop mounted equipment (LME), USB dongles, Customer Premises Equipment (CPE), modem etc.

Also in some embodiments, generic terminology "radio network node" or simply "network node (NW node)" is used. Such nodes can be any kind of network node, which may comprise base station, radio base station, base transceiver station, a centralized controller, a core network node, Mobility Management Entity (MME), base station controller, network controller, evolved Node B (eNB), Node B, Main eNode B (MeNode B), Secondary eNode B (SeNode B), relay node, access point, radio access point, Remote Radio Unit (RRU) Remote Radio Head (RRH) etc.

In some embodiments, the term "PCell" is used. This may, however, be a PSCell in dual connectivity (DC). In some embodiments the term "received time difference of signals between PCell and SCell" is used. However, the embodiments apply for the received time difference between signals of any two serving cells at the UE, e.g., between PCell and PSCell, and/or between two SCells.

The UE is connected to a PCell and may be configured by the network node with one or more SCells (or SCs). The SCells may be in deactivated or activated state, depending on commands from the network node or expiry of a SCell-Deactivation-Timer.

The PCell and one or more activated SCells that the UE is receiving and decoding for radio resource aggregation (e.g., carrier aggregation) are herein defined as belonging to the "aggregation set". The aggregation set may or may not contain all SCells that are activated by the network node. Reasons for not using an SCell for aggregation even if activated by the network include, for instance, when the time dispersion between all activated SCells at the UE exceeds what the UE can handle. In the carrier aggregation case, the minimum requirements for some LTE implementations state that the UE shall be capable of handling time dispersion of 30.26 μs between the earliest and latest arriving cells with respect to frame timing.

The time window within which the UE can aggregate cells is herein referred to as "aggregation window". The aggregation window is also interchangeably called a "received time difference window", "relative propagation delay difference between CCs", etc. The minimum size of this window is, e.g., 30.26 μs in case of carrier aggregation, again stemming from minimum requirements on supported time dispersion. The PCell must belong to the aggregation set and, hence, fall within the aggregation window.

FIG. 1 schematically illustrates a device 12 for selecting radio resources for aggregation.

The device 12 comprises a monitoring unit 102 for monitoring a time offset of a secondary radio resource relative to a primary radio resource. The device 12 further comprises a selecting unit 104 for selecting a set of radio resources out of at least two secondary radio resources provided by a telecommunications network.

The device 12 may be implemented in a UE. The UE may be configured to access the telecommunications network, e.g., via the primary radio resource and at least one of the secondary radio resources.

FIG. 2 shows a flowchart of a method 200 of operating the device 12 in FIG. 1.

A method 200 of selecting a set of radio resources of a cellular telecommunications network for radio resource aggregation in a communication between the telecommunications network and a User Equipment (UE) is shown in FIG. 2. In a step 202, a time offset relative to a primary radio resource is monitored for each of at least two secondary radio resources. The primary radio resource and the at least two secondary radio resources are provided by the telecommunications network for radio resource aggregation. If a spread of the monitored time offsets exceeds a threshold, a set of radio resources is selected out of the at least two secondary radio resources in a step 204, so that the time offsets monitored for the selected secondary radio resources fall within a time window having a width equal to or less than the threshold.

The units 102 and 104 may perform the steps 202 and 204, respectively. The method 200 may be performed by the UE.

The primary radio resource may be a PCell or PSCell and the secondary radio resource may be an SCell.

A UE that faces several configured and activated SCells, wherein one or more of them are leaving or entering the time difference range the UE can handle, e.g. 30.26 μs between the earliest and the latest received cell with respect to radio frame border, shall in case the first arriving and the last arriving SCells constitute the extremes, carefully evaluate which one of the two cells to drop from further aggregation.

FIG. 3 schematically illustrates carrier aggregation deployment scenarios 300.

FIG. 3 (a) schematically illustrates a carrier aggregation deployment scenario with co-located overlaid intra-band cells or carriers. Different carriers may have similar path loss.

A radio base station 302 using a carrier frequency F1 covers a cell area 310. The radio base station 302 using a carrier frequency F2 covers a cell area 312. The cell areas 310 and 312 are overlaid.

FIG. 3 (b) schematically illustrates a carrier aggregation deployment scenario with co-located overlaid inter-band cells or carriers. Different carriers may have different path loss.

A radio base station 302 using a carrier frequency F1 covers a cell area 310. The radio base station 302 using a carrier frequency F2 covers a cell area 312. The cell area 312 is arranged within the cell area 310. The cell area 312 is smaller than the cell area 310. The path loss for the carrier frequency F2 may be greater than the path loss for the carrier frequency F1.

FIG. 3 (c) schematically illustrates a carrier aggregation deployment scenario with co-located partially-overlaid inter-band cells or carriers.

A radio base station 302 using a carrier frequency F1 covers a cell area 310. The radio base station 302 using a carrier frequency F2 covers a cell area 312. The cell areas 310 and 312 are partially overlaid.

FIG. 3 (d) schematically illustrates a carrier aggregation deployment scenario with non-co-located inter-band cells or carriers. Remote radio heads 304 may provide an additional inter-band cell or carrier. The additional inter-band cell or carrier may provide improved throughput at hotspots 312.

A radio base station 302 using a carrier frequency F1 covers a cell area 310. The remote radio heads 304 using a carrier frequency F2 cover a cell area 312. The cell area 312 is arranged within the cell area 310. The cell area 312 is smaller than the cell area 310.

FIG. 3 (e) schematically illustrates a carrier aggregation deployment scenario with overlaid inter-band scenario with repeaters 304. The repeaters 304 may be implemented according to document 3GPP TS 36.300, V11.5.0, Annex J.

A radio base station 302 using a carrier frequency F1 covers a cell area 310. The radio base station 302 using a carrier frequency F2 covers a cell area 312-A. The cell area 312-A is smaller than the cell area 310. The cell area 312-A is arranged within the cell area 310. The cell area 312-A is smaller than the cell area 310. The path loss for the carrier frequency F2 may be greater than the path loss for the carrier frequency F1.

The remote radio heads 304 using the carrier frequency F2 cover a cell area 312-B. The cell area 312-B is arranged within the cell area 310. The cell area 312-B is smaller than the cell area 310.

A combined cell area 312-A and 312-B is arranged within the cell area 310. The combined cell area 312-A and 312-B is smaller than the cell area 310.

In any scenarios, the cell area 310 may provide the PCell and the cell area 312 may provide the SCell. In any scenarios, the radio base station 302 may be implemented by an eNB.

Examples of foreseen deployment scenarios, e.g., for LTE up to 3GPP Rel. 11, are shown in FIG. 3. For co-located intra-band scenario with fully overlapping coverage of PCell and SCell, the eNB can configure and activate the SCell when needed, based on reported measurements for PCell alone.

The timing of the SCell is prior known in case the UE has measured and reported the cell recently, either as inter-frequency neighbor cell or as a cell on a configured secondary component carrier F2. Additionally, regardless of having been reported before, the timing of the SCell is also considered prior known in case of intra-band contiguous carrier aggregation, i.e., where the spectrums for PCell and SCell are back-to-back. When the UE gets an activation command for the SCell under those conditions, the UE may be able to start reception from the cell without prior fine-tuning of the timing.

In case the cell has not been reported previously and is on another band (inter-band scenario) or non-adjacent, the timing of the SCell is not known to the UE. However, e.g. in an LTE implementation, it shall fall within ±30.26 μs (e.g., almost half an OFDM symbol) relative to the PCell. In this case, the timing of the SCell will have to be tuned before the UE can start reception from the SCell.

Future deployment scenarios 400 and inter-node aggregation are described with reference to FIG. 4.

Figure 4:
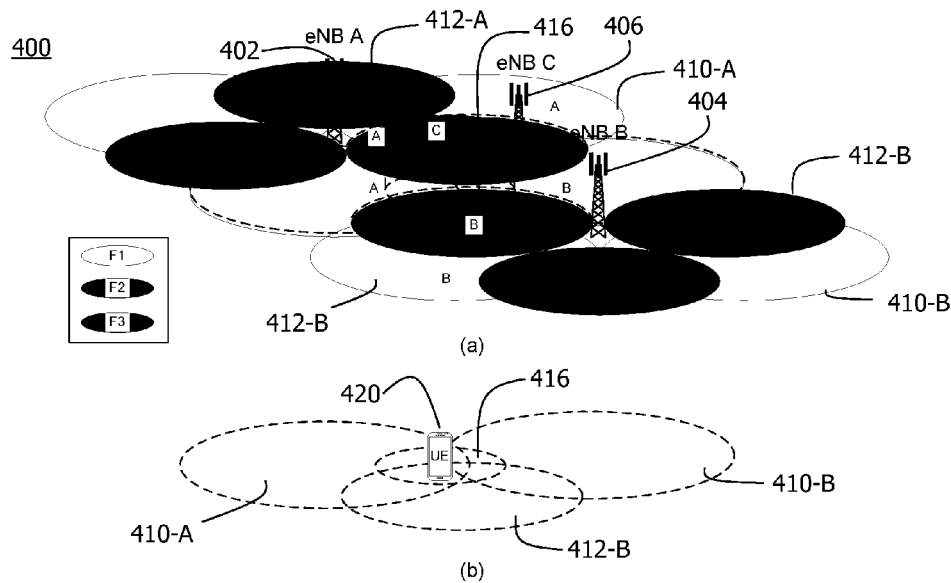
FIG. 4 schematically illustrates a setup for radio resource aggregation in a cellular telecommunications network including nodes with partially overlapping coverage areas.

FIG. 4 (a) schematically illustrates a scenario of partially overlapping coverage areas provided by nodes of the telecommunications network.

Due to the layout of partially overlaid cells in some locations a UE may have to aggregate one carrier (e.g., F1) from base station A (eNB A) and another carrier (e.g., F2)

from base station B (eNB B). Moreover, in particular spots the UE may also aggregate additional carriers, e.g. F3 cell from base station C (eNB C).

Exemplary eNBs for implementing the base stations A, B and C are shown at reference sign 402, 404 and 406, respectively. The eNB 402 provides cells 410-A at carrier F1 and cells 412-A at carrier F2. The cells 410-A and 412-A are partially overlapping.

The eNB 404 provides cells 410-B at carrier F1 and cells 412-B at carrier F2. The cells 410-B and 412-B are partially overlapping.

The eNB 406 provides a cell 416 at carrier F3. The cells 410-A, 410-B, 412-B and 416 are partially overlapping.

In FIG. 4 (b), a UE 420 is in coverage of multiple cells, e.g., the cells 410-A, 412-B and 416, at different carriers, e.g., at carries F1, F2 and F3, respectively.

From 3GPP Rel. 12 and onwards, so-called inter-node radio resource aggregation is under discussion (3GPP TR 36.842). For one of the foreseen scenarios, the UE may be connected to a primary cell (also referred to as master cell) handled by one base station, and simultaneously to between one and four secondary cells (also referred to as assisting cells) handled by one or more other base stations. In case the primary cell and the one or more secondary cells are on different carriers, the UE can aggregate it similar to how it is done for the Rel. 11 deployment scenarios in FIG. 3 above, with one difference. Up to 3GPP Rel. 11 the aggregated cells were handled by the same base station with either co-located cells on different carriers but sent from the same site, or non-co-located cells on different carriers. The non-co-located cells provide carriers using one or more remote radio heads (RRHs), e.g., according to the deployment scenarios in FIG. 3 (d) and FIG. 3 (e).

Figure 6:
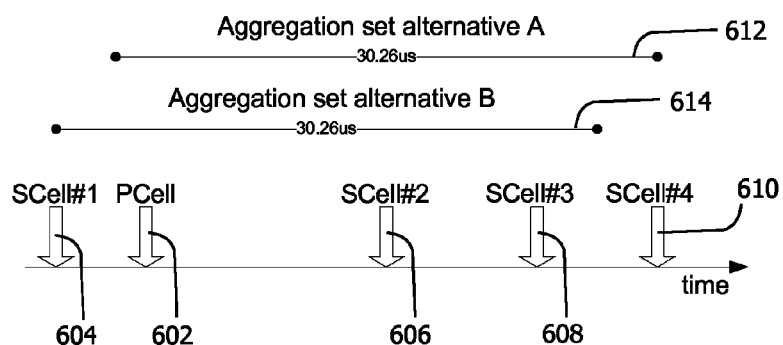
FIG. 6 schematically illustrates shifted time windows for radio resource aggregation.

One example of inter-node radio resource aggregation or inter-node carrier aggregation is shown in FIG. 6. Here, a UE 420 that is in coverage of base station A (e.g., eNB A at reference sign 402) on one carrier, base station B (e.g., eNB B at reference sign 404) on the other carrier, and base station C (e.g., eNB C at reference sign 406) on a third carrier may aggregate all three carriers, even if the cells (e.g., the cells 410-A, 412-B and 416) are handled by different base stations.

Up to 3GPP Rel. 11, aggregation would only be done within each respective base station (A or B or C, not in combination).

The cells on some carriers may have macro coverage (large cell radius, e.g. the cells 410-A) whereas other may have hotspot coverage (small cell radius, e.g., the cell 416).

At a given location, there may be multiple such layers illustrated in FIG. 4, e.g., overlapping each other at least partially. Although current assumption in the standard is that the UE 420 shall be capable of aggregating up to 5 carriers, there is no such limitation on the number of carriers within which the UE 420 may be in coverage. It can be assumed that in future deployment scenarios virtually every suitable spectrum will be used in order to meet the targets for fifth generation of mobile communication systems (5G). It can also be foreseen that at a given location, there will be a mix of macro-cells and pico-cells, and a mix of intra-node and inter-node aggregation. Moreover, for 5G, mobile base stations are considered. The essence is that future deployment scenarios will be complex.

Figure 5:
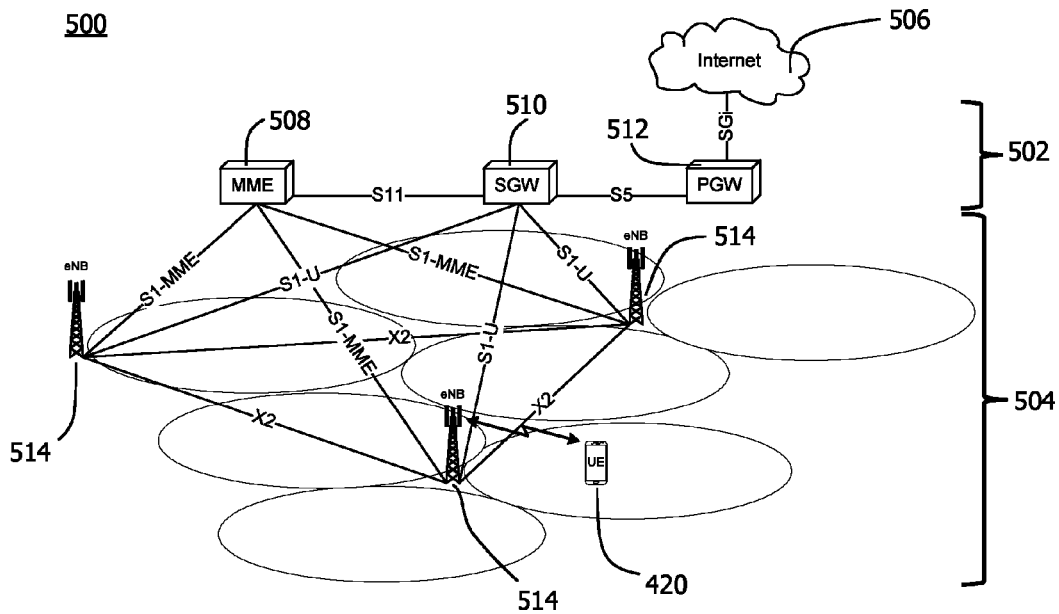
FIG. 5 schematically illustrates nodes of a telecommunications network.

FIG. 5 schematically illustrates nodes of the telecommunications network 500 in an exemplary LTE implementation.

The telecommunications network 500 comprises a packet core network 502 and a radio access network 504. The packet core network 502 is connected to a packet data network (PDN) 506, e.g., the Internet. The packet core network 502 includes a Mobility Management Entity (MME) 508, a serving gateway (SGW) 510 and a PDN gateway (PGW) 512.

The radio access network 504 includes transmission points (TPs) 514 configured to provide radio access to the UE 420. Any access points, encompassing radio base stations 302, 402, 404, 406 and remote radio heads 304, are collectively referred to as TPs 514. Reference sign 420 refers to any type of UE.

The aggregation may be implemented in the context of a Dual Connectivity (DC). In dual connectivity, the UE 420 is connected to two network nodes: a main eNodeB and a secondary eNodeB, abbreviated MeNB and SeNB, respectively. Each of them is associated with a PCC and potentially one or more SCCs. The primary cell associated with the MeNB is called PCell and the corresponding cell for the SeNB is called PSCell. The MeNB and the SeNB may operate independently, meaning that the UE 420 communicates with both, and may have separate DRX cycles, SCell measurement cycles, etc. The UE 420 in DC typically has separate TX/RX for each of the connections with MeNB and SeNB. This allows the MeNB and SeNB to independently configure the UE 420 with one or more procedures, e.g., radio link monitoring (RLM), discontinuous reception (DRX) cycle etc., on their PCell and PSCell, respectively.

Requirements are still under discussions in the 3GPP standard, e.g. whether the UE can assume any kind of synchronization with respect to the frame timing between the MeNB and SeNB.

An exemplarily configuration of SCells is described. The following information is provided to the UE 420 when the network node configures a SCell (e.g., according to 3GPP TS 36.331 V11.7.0, section 6.3.2). The information is reproduced here for later reference.

```
RadioResourceConfigCommonSCell-r10 ::= SEQUENCE {
    -- DL configuration as well as configuration applicable for DL and UL
    nonUL-Configuration-r10          SEQUENCE {
        -- 1: Cell characteristics
        dl-Bandwidth-r10                 ENUMERATED {n6, n15, n25, n50, n75, n100},
        -- 2: Physical configuration, general
        antennaInfoCommon-r10            AntennaInfoCommon,
        mbsfn-SubframeConfigList-r10     MBSFN-SubframeConfigList   OPTIONAL, -- Need OR
        -- 3: Physical configuration, control
        phich-Config-r10                 PHICH-Config,
        -- 4: Physical configuration, physical channels
        pdsch-ConfigCommon-r10           PDSCH-ConfigCommon,
        tdd-Config-r10                   TDD-Config                 OPTIONAL -- Cond
    TDDSCell
    },
    -- UL configuration
```

-continued

```
ul-Configuration-r10                     SEQUENCE {
    ul-FreqInfo-r10                      SEQUENCE {
        ul-CarrierFreq-r10                   ARFCN-ValueEUTRA         OPTIONAL, -- Need OP
        ul-Bandwidth-r10                     ENUMERATED {n6, n15,
                                                 n25, n50, n75, n100} OPTIONAL, -- Need OP
        additionalSpectrumEmissionSCell-r10  AdditionalSpectrumEmission
    },
    p-Max-r10                            P-Max                       OPTIONAL, -- Need OP
    uplinkPowerControlCommonSCell-r10    UplinkPowerControlCommonSCell-r10,
    -- A special version of IE UplinkPowerControlCommon may be introduced
    -- 3: Physical configuration, control
    soundingRS-UL-ConfigCommon-r10       SoundingRS-UL-ConfigCommon,
    ul-CyclicPrefixLength-r10            UL-CyclicPrefixLength,
    -- 4: Physical configuration, physical channels
    prach-ConfigSCell-r10                PRACH-ConfigSCell-r10       OPTIONAL, -- Cond
TDD-OR-NoR11
    pusch-ConfigCommon-r10               PUSCH-ConfigCommon
}                                                                    OPTIONAL, -- Need OR
...,
[[ ul-CarrierFreq-v1090                  ARFCN-ValueEUTRA-v9e0       OPTIONAL -- Need OP
]],
[[ rach-ConfigCommonSCell-r11            RACH-ConfigCommonSCell-r11  OPTIONAL, --
Cond UL
    prach-ConfigSCell-r11        PRACH-Config             OPTIONAL, -- Cond UL
    tdd-Config-v1130             TDD-Config-v1130         OPTIONAL, -- Cond TDD2
    uplinkPowerControlCommonSCell-v1130
                                 UplinkPowerControlCommonSCell-v1130  OPTIONAL -- Cond UL
]]
}
PDSCH-ConfigCommon ::=  SEQUENCE {
    referenceSignalPower        INTEGER (-60..50),
    p-b                         INTEGER (0..3)
}
```

Conventional techniques for determining radio resources for aggregation become infeasible as telecommunications network complexity increases. With increased complexity in the telecommunications network deployment, it becomes challenging for the telecommunications network to perform cell planning and maintain accurate information on which cells are suitable for aggregation with respect to UE constraints on time difference between the cells in the active aggregation set (e.g., the set of cells that the UE is actively using in the aggregation). Particularly in urban areas or hilly terrain, the UE may go in and out of line-of-sight in one or more of the cells. As a result the relative time difference between the cells in the aggregation set may change, leading to that suddenly one or more of the SCells are not suitable for aggregation.

Furthermore, conventional UE implementations have no means for deciding which SCell to drop, should it be that the time window that the UE is capable of performing carrier aggregation within is spanned by two or more SCells.

FIG. 6 schematically illustrates a radio frame time of arrival. Timing positions 602 and 604 to 610 are indicted for a PCell and 4 potential SCells.

The UE 420 has to drop either SCell#1 (with timing 604) or SCell#4 (with timing 610) from the aggregation set to maintain aggregation over the supported time window having a width of 30.26 µs. The former option is indicated by a time window 612. The latter option is indicated by a time window 614.

Although described in the context of carrier aggregation, the technique is applicable also to the radio resource aggregation in general. An extended implementation applies to all cases of the UE 420 being able to receive multiple streams that are fairly time-aligned with each other, e.g., on the same carrier or on different carriers, and/or wherein the processing distinguishes between the individual cells involved.

Examples may include multi-stream aggregation and dual connectivity, e.g., depending on final agreements in the standard. Moreover, the technique is applicable to future deployment scenarios for contiguous carrier aggregation, wherein the assumption in the standard may be that for such deployment the cells are transmitted from the same site and are thus time aligned, e.g., down to 130 ns, also at the UE antenna connector. Furthermore, a real deployment may differ from such an assumption and the UE 420 may have to be robust against larger delay spread.

A UE 420 monitoring the timing (e.g., 604 to 610) of activated SCells is described with reference to FIG. 7. In case some of the activated SCells are outside the supported aggregation window (e.g., having a minimum width of 30.26 µs), the UE 420 assesses whether the aggregation window shall be moved.

Figure 7:
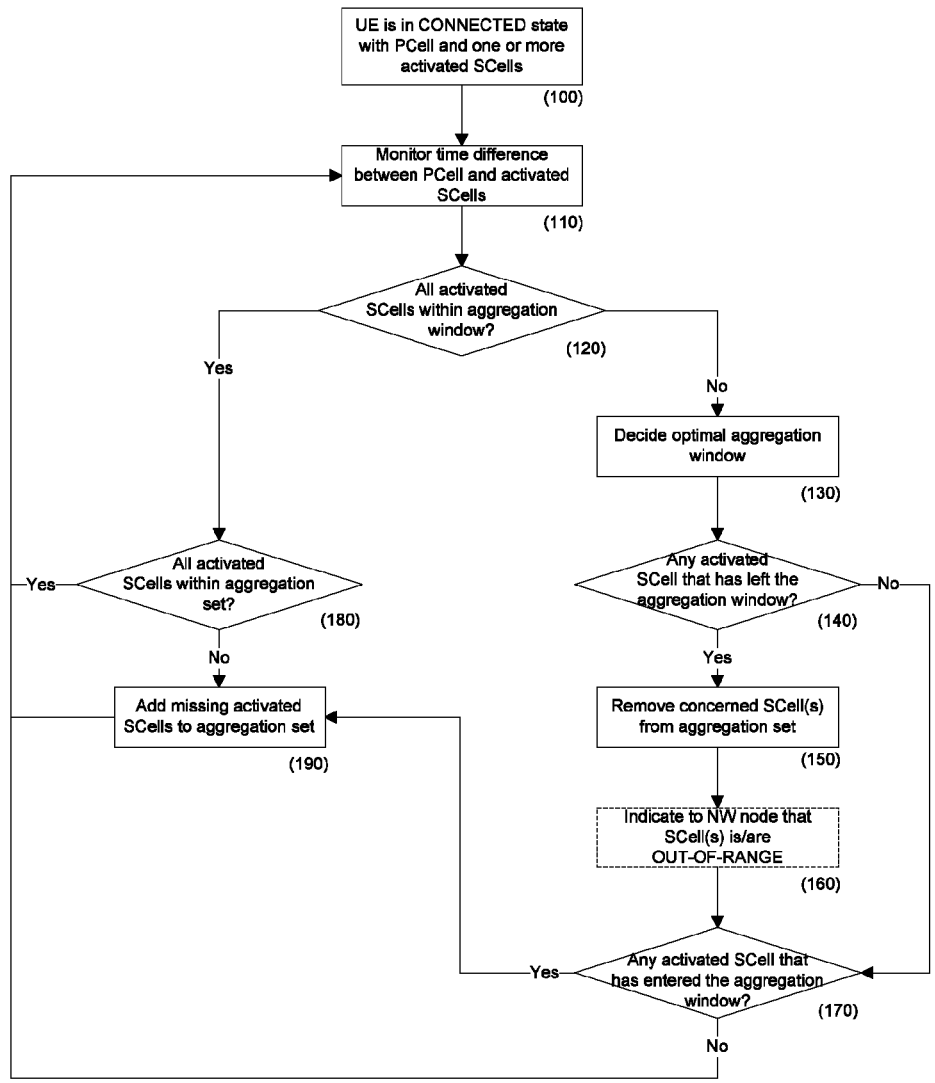
FIG. 7 shows a flowchart of a method embodiment of the method of FIG. 2.

FIG. 7 shows a flowchart 700 for a first method embodiment of the method 200.

According to the first embodiment, a UE 420 is configured for monitoring the timing of the activated SCells and assessing whether the aggregation window has to be moved.

In FIG. 7, the UE 420 is connected to a PCell and configured with one or more activated SCells (in a state 100). It monitors timing for the SCells and compares the timings with the PCell (step 110).

The UE 420 checks whether all activated SCells are within the existing aggregation window in a step 120. If so (step 120; YES), the UE 420 checks whether all activated SCells are within the aggregation set in a step 180 and, hence, are received and used in the aggregation. If not (step 180; NO), the UE 420 adds the missing cells to the aggregation set (step 190).

The step 110, and optionally the steps 120, 180 and 190, is an exemplary implementation of the step 202.

If the UE 420 finds that there are activated SCells that fall outside the aggregation window (step 120; NO), the UE 420 checks whether any activated SCell has left or entered the range relative the PCell. Leaving and entering the aggregation window may collectively be referred to as a movement.

A SCell whose timing differs from the PCell by, e.g., 30.26 μs (e.g., according to minimum requirements) or more does not have to be further considered in the case of carrier aggregation, since it would mean that the particular cell and the PCell cannot be in the aggregation set simultaneously, and is not an alternative to drop the PCell.

If there has been any movement with respect to frame timing of the activated SCells and/or the PCell, the UE 420 assesses whether to move the aggregation window (step 130).

Moving the aggregation window may mean that some activated SCells currently not in the aggregation set can be included, and also that one or more SCells currently in the aggregation set may have to be removed. How the decision is made is described further below.

If any SCell in the aggregation set falls outside the aggregation window (step 140; YES), that SCell is removed from the aggregation set (step 150) by which the UE 420 stops receiving and decoding information from the corresponding SCell. The SCell is still included in mobility measurements. Hence, the UE 420 can continue to monitor its timing (e.g., in the step 202, particularly in the implementation step 110) and later evaluate the corresponding SCell for inclusion in the aggregation set again.

The UE 420 may indicate to the network 500 that the SCell has fallen out-of-range (step 160), e.g., by means of a report.

In case an activated SCell previously not part of the aggregation set now falls inside the aggregation window (step 170; YES), the UE 420 includes the cell in the aggregation set (step 190).

The UE 420 bases the decision on which cells to remove and which to include, e.g., on any or a combination of the following criteria.

For a first criterion, the UE 420 determines whether an SCell has an associated UL in case of UL carrier aggregation. If so, dropping the cell may cause a throughput loss on the UL and also potentially on DL in several SCells that are served by the same network node.

A second criterion is applicable in a case of deciding between two SCells, wherein one is used for cross carrier scheduling. The one used for cross carrier scheduling may be prioritized over the other, e.g., since otherwise there will be an impact also on one or more other SCells.

A third criterion is applicable in case of deciding between two SCells both with associated ULs. The one with the largest timing advance may be dropped, e.g., since timing advance is a proxy for distance and the larger the distance in general the lower the throughput.

For a fourth criterion, the UE 420 determines whether particular services are supported in the SCell. Such services may include, e.g., receiving MBMS. One or more SCells that are part of a Multicast Broadcast Single Frequency Network (MBSFN) may be prioritized over one or more SCells only providing unicast.

A fifth criterion includes the theoretical throughput of the SCell, e.g., for unicast reception. A SCell with larger bandwidth, more Tx antenna ports in use and/or less subframes reserved for MBSFN, may be prioritized over an SCell with lesser or fewer.

In case of Time Division Duplex (TDD), the UL/DL configuration in the cell may also be taken into account. Particularly, if mainly engaged in reception on DL, an SCell which is asymmetric towards downlink rather than uplink may be prioritized, E.g. Uplink-downlink configuration 2 may be prioritized over Uplink-downlink configuration 0 (3GPP TS 36.211 V11.5.0, Table 4.2-2).

A sixth criterion includes the achieved quality in a SCell currently in the aggregation set. E.g. a new SCell (and in this respect unknown) may be prioritized over an existing one that displays high BLER and/or low CQI and/or rank.

If BLER and CQI are only calculated for SCells under active reception, such metrics may be are unavailable for the new SCell.

A seventh criterion includes the signal strength and/or the signal quality, as determined from mobility measurements. The seventh criterion may include one or more of reference signal received power (RSRP), reference signal received quality (RSRQ); and signal-to-interference-plus-noise-ratio (SINR) estimation. E.g., a SCell with sufficient signal strength (e.g., given by RSRP) and low interference (e.g., given by SINR) and/or load (e.g., indicated by RSRQ and can be further refined taking into account also RSRP and SINR) may be prioritized.

The seventh criterion may be available, e.g., since regardless of whether a SCell is in the aggregation set, the corresponding SCell is subjected to mobility measurements.

At least for some implementations, the examples above are metrics and criteria and configurations that the UE 420 already has access to or can easily derive without any significant increase in complexity.

According to a second embodiment, a UE 420 is configured for further taking mobility into account.

As an extension to the first embodiment, the UE 420 may further take its mobility into account when deciding which SCell to drop from the aggregation set, in case not all can be covered by the aggregation window.

If the UE 420 assesses it is moving at some speed exceeding a threshold (that may be deduced using any prior art method, e.g., based on cell timing drift or estimation of Doppler spread), the UE 420 may for instance perform any or a combination of the following actions. The actions may be performed in the monitoring step 202.

A first action includes analyzing trends for RSPR and/or other signal metrics such as RSRQ and SINR, to prioritize an SCell whose signal strength and/or signal quality is increasing over an SCell that either is weak already or displays a trend of going into less favorable conditions.

A second action includes analyzing the cell timing drift trend to determine if a SCell anyway is on the way out from the aggregation window while another SCell candidate is appearing more stationary relative to, e.g., the PCell. If so, the SCell that appears stationary may be prioritized, e.g., since it is more likely that the corresponding SCell can be used in the near future.

A third action includes, in case the decision is between two SCells both with associated UL carriers, analyzing trends with respect to timing advance and prioritize a SCell whose timing advance trend is decreasing or stationary over a SCell that displays an increasing trend.

A fourth action includes deciding based on SCell characteristics such as predicted cell radius. The cell radius may be estimated based on a parameter "referenceSignalPower" (e.g., eNodeB Tx power in dBm) and carrier frequency information in the RadioResourceConfigCommonSCell-r10 information element (e.g., according to 3GPP TS 36.331 V12.1.0, section 6.3.2) and by modelling the dependency between path loss, frequency and distance. An SCell with larger cell radius may be prioritized over a SCell with a smaller radius, e.g., since it is more likely that the SCell with larger radius can be used in the near future. The decision may also take into account an estimated distance from each respective SCell site, e.g., by also taking into account measured RSRP. The fourth action may determine how close the UE 420 is to the cell border derived above.

Figure 8:
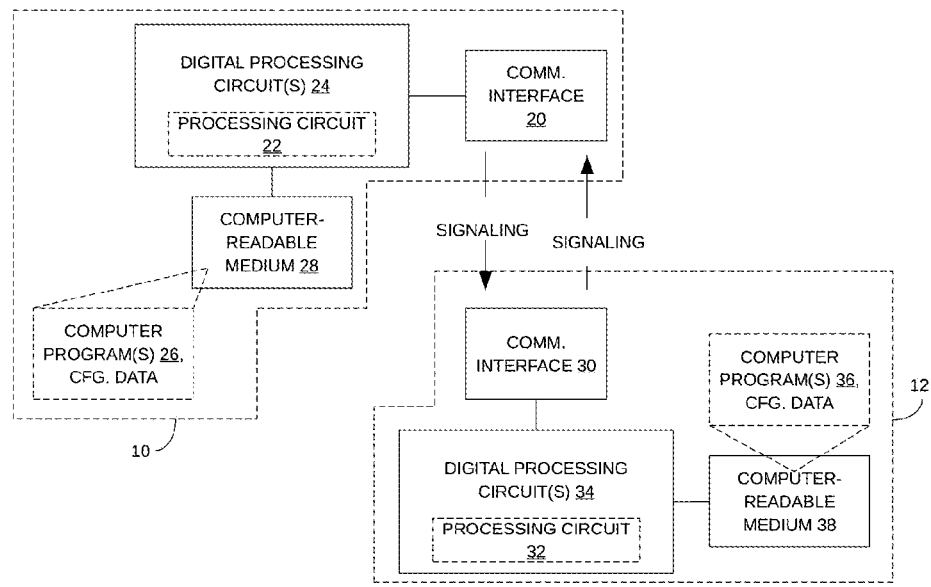
FIG. 8 schematically illustrates a system comprising an embodiment of network node and an embodiment of a UE.

Additional embodiments, which can be combined with any one of above embodiments, are described with reference to FIG. 8. A block diagram 800 shown in FIG. 8 illustrates an embodiment of a network node 10 (e.g., the base station 514) and one embodiment of a wireless device 12 as an example of a UE 420 (according to non-limiting node and device examples). In a non-limiting example, the node 10 comprises a network base station, such as an eNB in an LTE network 500.

The wireless device 12 may be an embodiment of the device 12 of FIG. 2.

The node 10 includes a communication interface 20, which may comprise more than one communication interface. For example, in a base station embodiment 514 of the node 10, the communication interface 20 includes radiofrequency transceiver circuitry, i.e., receiver and transmitter circuitry, for transmitting signals to wireless devices 12 in one or more cells supported by the node 10, and for receiving signals from such devices 12. The communication interface 20 may further comprise an inter-base station signaling interface and/or a Core-Network interface to one or more nodes in a Core Network 502 associated with the Radio Access Network portion 504 of the wireless network 500 in which the node 10 is configured to operate.

The node 10 further includes a processing circuit 22 that is configured to carry out any or all of the one or more network-side processing discussed herein. The processing circuit 22 may comprise, or be included in, a number of digital processing circuits 24. Non-limiting examples of such circuitry include a microprocessor, Digital Signal Processor, Application Specific Integrated Circuit (ASIC), Field Programmable Gate Array (FGPA) and/or one or more other digital processing circuits. Such circuitry may be configured as fixed circuitry, or as programmed circuitry, or as a mix of fixed and programmed circuitry.

The processing circuit 22 is configured to carry out the network-node processing as taught herein based at least in part on the execution of a computer program product 26 stored in a computer-readable medium 28, which may also store configuration information, e.g., configuration information to be sent to the wireless device 12. It will be understood that the computer program product 26 comprises computer program instructions and that the execution of those program instructions by the digital processing circuits 24 specially adapt the digital processing circuits 24 to carry out the processing operations taught herein, including execution of the disclosed algorithms.

The computer-readable medium 28 may actually comprise media, e.g., more than one memory device and/or more than one type of memory, such as EEPROM, FLASH and/or Solid State Disk. The computer-readable medium 28 also may include working memory, such as SRAM. In any case, however, the computer-readable medium 28 stores the computer program 26 in question in a non-transitory state, e.g., in non-volatile memory, although it may be transferred in whole or in part to other memory for execution.

As for the device 12, e.g., the UE 420, it includes a communication interface 30, which comprises or includes radiofrequency transceiver circuitry, i.e., receiver and transmitter circuitry, for transmitting signals to and receiving signals from one or more nodes in a wireless communication network (e.g., the network 500) in which the device 12 is configured to operate. For example, the network node 10 is a base station 514 and the device 12 is configured to communicate with the network node 10 according to the defined air interface protocols, structure, timing, etc.

The device e.g. UE 12 further includes a processing circuit 32 that is configured to carry out any or all of the device-side method steps taught herein. The processing circuit 32 may comprise or be included in a number of digital processing circuits 34. Non-limiting examples of such circuitry include a microprocessor, Digital Signal Processor, Application Specific Integrated Circuit (ASIC), Field Programmable Gate Array (FGPA), and/or one or more other digital processing circuits. Such circuitry may be configured as fixed circuitry, or as programmed circuitry, or as a mix of fixed and programmed circuitry.

In at least one embodiment, the processing circuit 32 is configured to carry out the device-side processing as taught herein based at least in part on the execution of a computer program product 36 stored in a computer-readable medium 38, which may also store configuration information (e.g., configuration information received in a message from the node 10). It will be understood that the computer program product 36 comprises computer program instructions and that the execution of those program instructions by the digital processing circuits 34 specially adapt the digital processing circuits 34 to carry out the device-side processing operations taught herein, including execution of the disclosed algorithms.

The computer-readable medium 38 may actually comprise media, e.g., more than one memory device and/or more than one type of memory, such as EEPROM, FLASH and/or Solid State Disk. The computer-readable medium 38 also may include working memory, such as SRAM. In any case, however, the computer-readable medium 38 stores the computer program 36 in question in a non-transitory state, e.g., in non-volatile memory, although it may be transferred in whole or in part to other memory for execution.

As has become apparent from above exemplary embodiments, at least some embodiments of the technique allow flexibly and/or efficiently selecting a set of radio resources for aggregation, even if network topology is complex, changing in time and/or partially unknown at the network side.

The same or other embodiments allow a UE, which faces several configured and/or activated SCells, wherein one or more of them are leaving or entering the radio frame time difference range that the UE can aggregate over, to judge which SCells to keep and which to drop in order to get as good service as possible. Service may refer to achieved throughput and also, e.g., to MBMS, or a combination thereof.

It is believed that many advantages of the present disclosure will be fully understood from the foregoing description, and it will be apparent that various changes may be made in the form, construction and arrangement of the exemplary aspects thereof without departing from the scope of the invention, or without sacrificing all of its advantages.

The invention claimed is:

1. A method of selecting a set of radio resources of a cellular telecommunications network for radio resource aggregation in a communication between the telecommunications network and a User Equipment, UE, the method comprising the following steps performed by the UE:
monitoring, for each of at least two secondary radio resources, a time offset of the secondary radio resource relative to a primary radio resource, the primary radio resource and the at least two secondary radio resources being provided by the telecommunications network for radio resource aggregation; and if a spread of the monitored time offsets exceeds a threshold, selecting out of the at least two secondary radio resources a set of radio resources so that the time offsets monitored for the selected secondary radio resources fall within a time window that is referenced to a timing of the primary radio resource and has a width equal to or less than the threshold.

2. The method of claim 1, wherein the set includes the primary radio resource and/or the time window includes a reference time corresponding to a time origin of the primary radio resource.

3. The method of claim 1, wherein the selection includes:
shifting the time window relative to a reference time corresponding to a time origin of the primary radio resource; and
selecting some or all of the at least two secondary radio resources, the time offsets of which fall within the shifted time window.

4. The method of claim 1, wherein the time window is shifted so as to maximize or optimize a number of selected secondary radio resources.

5. The method of claim 1, wherein the time window is shifted so as to maximize or optimize a bandwidth of the selected secondary radio resources.

6. The method of claim 1, wherein the selection is based on signal measurements performed by the UE for some or each of the at least two secondary radio resources.

7. The method of claim 6, wherein the signal measurements of the selected secondary radio resources fulfill a predetermined criterion.

8. The method of claim 6, wherein the signal measurements are repeatedly performed for some or each of the at least two secondary radio resources and the selection depends on a trend of the repeated signal measurements.

9. The method of claim 1, wherein the selection includes assigning priorities to some or each of the at least two secondary radio resources for the selection.

10. The method of claim 9, wherein the assigned priorities give preference to previously selected secondary radio resources.

11. The method of claim 9, wherein the assigned priorities give preference to secondary radio resources currently used for the communication between the telecommunications network and the UE.

12. The method of claim 9, wherein a radius of coverage of the secondary radio resource contributes to the priority assigned to the secondary radio resource.

13. The method of claim 1, wherein the selection is restricted to those secondary radio resources the time offset of which does not exceed the threshold.

14. The method of claim 1, further comprising:
receiving a message from the telecommunications network that configures the UE to monitor the at least two secondary radio resources for radio aggregation.

15. The method of claim 14, wherein the message is indicative of at least some of the at least two secondary radio resources.

16. The method of claim 1, wherein the steps of monitoring and selecting are repeated, and wherein time offsets are monitored also for secondary radio resources not previously selected.

17. The method of claim 1, further comprising:
reporting the set of radio resources for radio resource aggregation to the telecommunications network.

18. The method of claim 17, wherein the reporting of the set to the telecommunications network is performed if the spread of the monitored time offsets exceeds the threshold.

19. The method of claim 17, wherein the reporting is performed in response to one or more time offsets monitored for the secondary radio resources entering the time window.

20. The method of claim 17, wherein the set is reported by indicating to the telecommunications network those one or more secondary radio resources provided by the telecommunications network and not included in the set and/or by indicating changes to the set.

21. The method of claim 17, in combination with at least claim 6, wherein the selection is based on signal measurements performed by the UE for some or each of the at least two secondary radio resources, and wherein the reporting includes results of the signal measurements for some or each of the selected secondary radio resources.

22. The method of claim 1, wherein the secondary radio resources include one or more Secondary Cells, SCells, one or more Secondary Component Carriers, SCCs, and/or one or more neighboring cells relative to a cell serving the UE.

23. The method of claim 1, wherein the aggregation includes a Carrier Aggregation, CA, and/or the radio resources in the set include Component Carriers, CCs, for the CA.

24. The method of claim 1, wherein the aggregation includes an intra-frequency aggregation and/or the radio resources in the set include different spatial streams for the intra-frequency aggregation.

25. The method of claim 1, wherein at least some of the radio resources relate to non-collocated cells of the telecommunications network and/or different nodes of the telecommunications network.

26. The method of claim 1, wherein the aggregation includes a Coordinated Multi-Point, CoMP, operation.

27. A non-transitory computer readable medium storing a computer program product comprising program instructions that, when executed by a processing circuit of a User Equipment, UE, configures the UE for selecting a set of radio resources of a cellular telecommunications network for radio resource aggregation in a communication between the UE and a telecommunications network, said computer program comprising program instructions configuring the UE to:
monitor, for each of at least two secondary radio resources, a time offset of the secondary radio resource relative to a primary radio resource, the primary radio resource and the at least two secondary radio resources being provided by the telecommunications network for radio resource aggregation; and
if a spread of the monitored time offsets exceeds a threshold, select out of the at least two secondary radio resources a set of radio resources so that the time offsets monitored for the selected secondary radio resources fall within a time window that is referenced to a timing of the primary radio resource and has a width equal to or less than the threshold.

28. A device for selecting a set of radio resources of a cellular telecommunications network for radio resource aggregation in a communication between the telecommunications network and a User Equipment, UE, the device comprising a processing circuit configured to:
monitor, for each of at least two secondary radio resources, a time offset of the secondary radio resource relative to a primary radio resource, the primary radio resource and the at least two secondary radio resources being provided by the telecommunications network for radio resource aggregation; and select out of the at least two secondary radio resources, if a spread of the monitored time offsets exceeds a threshold, a set of radio resources so that the time offsets monitored for the selected secondary radio resources fall within a time window that is referenced to a timing of the primary radio resource and has a width equal to or less than the threshold.

29. The device of claim 28, wherein the set includes the primary radio resource and/or the time window includes a reference time corresponding to a time origin of the primary radio resource.

30. The device of claim 28, wherein the processing circuit is further configured to:
   shift the time window relative to a reference time corresponding to a time origin of the primary radio resource; and
   select some or all of the at least two secondary radio resources the time offsets of which fall within the shifted time window.

31. The device of claim 28, wherein the processing circuit is further configured to shift the time window so as to maximize or optimize a number of selected secondary radio resources.

32. The device of claim 28, wherein the processing circuit is further configured to shift the time window so as to maximize or optimize a bandwidth of the selected secondary radio resources.

33. The device of claim 28, wherein the selection by the processing circuit is based on signal measurements performed by the UE for some or each of the at least two secondary radio resources.

34. The device of claim 28, wherein the device comprises the UE, and wherein the UE further comprises a communication interface that includes radiofrequency transceiver circuitry configured for communicating with the telecommunications network.

* * * * *